United States Patent
Ketterling

(10) Patent No.: US 11,332,965 B2
(45) Date of Patent: May 17, 2022

(54) LOCKING BRACKET ASSEMBLY FOR IRRIGATION TIMER CONTROL BOX

(71) Applicant: Kody J. Ketterling, Twin Falls, ID (US)

(72) Inventor: Kody J. Ketterling, Twin Falls, ID (US)

(*) Notice: Subject to any disclaimer, the term of this patent is extended or adjusted under 35 U.S.C. 154(b) by 95 days.

(21) Appl. No.: 16/995,794

(22) Filed: Aug. 17, 2020

(65) Prior Publication Data

US 2020/0386020 A1    Dec. 10, 2020

Related U.S. Application Data

(63) Continuation-in-part of application No. 15/671,115, filed on Aug. 7, 2017, now Pat. No. 10,745,949.

(51) Int. Cl.
*E05C 3/04*     (2006.01)
*A01G 25/16*    (2006.01)
(Continued)

(52) U.S. Cl.
CPC ............ *E05C 3/041* (2013.01); *A01G 25/165* (2013.01); *E05B 17/2088* (2013.01);
(Continued)

(58) Field of Classification Search
CPC .. E05B 17/00; E05B 17/2084; E05B 17/2088; E05B 63/12; E05B 35/00; E05B 35/008; E05C 3/00; E05C 3/041; E05C 3/042; E05C 3/043; E05C 3/044; E05C 3/045; E05C 3/046; A01G 25/00; A01G 25/165; H02B 1/00; H02B 1/42; H02B 1/44; H02G 3/00; H02G 3/14
(Continued)

(56) References Cited

U.S. PATENT DOCUMENTS 5,245,507 A * 9/1993 Ericksen ............ H02B 1/28
174/67
6,519,208 B2 * 2/2003 DeVries ............ G04G 15/00
368/10
(Continued)

*Primary Examiner* — Nathan Cumar
(74) *Attorney, Agent, or Firm* — Burdick Patents, P.A.; Sean D. Burdick

(57) ABSTRACT

A locking bracket assembly prevents unauthorized opening of an irrigation timer box of the type having a cam lock mounted to a hinged cover. The locking bracket assembly includes a lower mounting bracket, locking hardware for attaching the lower mounting bracket to an outer surface of the timer box, and a vertical extension bracket for vertically adjustable attachment to the lower mounting bracket. An upper length of the vertical extension bracket extends at an acute angle from a lower length that is configured for parallel alignment with both the lower mounting bracket and a sidewall of the timer box. When the cover of the timer box is closed, the acute angle allows the upper length of the vertical extension bracket to pass into the timer box and emerge through a slot cut in the cover, and the cam lock can then be rotated to engage a slot formed in part of the upper length of the vertical extension bracket that remains within the timer box. An arresting tab and guide slot prevent misalignment of the brackets and allow height adjustment of the assembly to accommodate various timer box sizes.

14 Claims, 15 Drawing Sheets

(51) Int. Cl.
*E05B 17/20* (2006.01)
*H02G 3/14* (2006.01)
*E05B 35/00* (2006.01)
*H02B 1/42* (2006.01)

(52) U.S. Cl.
CPC .............. *E05B 35/008* (2013.01); *H02B 1/42* (2013.01); *H02G 3/14* (2013.01)

(58) Field of Classification Search
USPC ........................................................ 292/187
See application file for complete search history.

(56) References Cited

U.S. PATENT DOCUMENTS 7,997,843 B2 \* 8/2011 Bowers ................... F16B 43/00
411/533
8,037,723 B2 \* 10/2011 Fong ...................... A45C 13/18
70/58
9,413,150 B2 \* 8/2016 Peret ........................ H02G 3/14

\* cited by examiner

US 11,332,965 B2

LOCKING BRACKET ASSEMBLY FOR IRRIGATION TIMER CONTROL BOX

RELATED APPLICATIONS

This application is a continuation-in-part of and claims priority to U.S. application Ser. No. 15/671,115 that was filed on Aug. 7, 2017 and which is fully incorporated herein by reference.

TECHNICAL FIELD

This invention relates to a locking bracket for installation, either as original equipment or a retrofitted piece of equipment to a lockable box designed to contain irrigation sprinkler control modules.

BACKGROUND OF THE INVENTION

There are many regions of the United States that are arid or semi-arid to the extent they require regular irrigation to maintain the health and vitality of the landscaping and grass. In some cases these arid and semi-arid regions routinely experience a shortage of water, and as a result water drawn from a municipal water system is a precious and expensive commodity to be conserved as much as possible. In extreme cases of potable water shortage, the amount of water consumed on a piece of property can be priced such that the lowest prices are charged for the minimum amount of water usage and then prices increase on a graduated scale, depending upon the excess usage of water, to discourage excessive consumption of water. Accordingly, it is in the property owner's best interests to use the minimum amount of water that is necessary to sustain the grass and landscaping features of any particular property.

Most residential houses, in arid and semi arid regions, have an underground sprinkler system provided with a timer control, usually located in an enclosed garage. These residential timer controls are not encased within a lockable box so that they are easily accessible to the homeowner for purposes of adjusting the timing and duration of the irrigation cycles, as the seasons pass and the requirements for irrigation increase and/or decrease. The typical timer is provides for a number of different circuits, normally nine or less, and give the operator flexibility as to the number of times a circuit automatically turns on each day, the length of run time for each cycle, and the even the days of the week that the irrigation system actually is operable to control the circuits, for example every day or every other day.

In commercial settings such as a multiple apartment buildings or office complexes, these timers are contained within lockable sprinkler timer boxes which are mounted to the exterior of the building someplace convenient for the landscapers to set them up and control the irrigation. If there are multiple buildings the sprinkler boxes are generally not located in one central location as that would require low voltage wiring runs to the various sprinkler circuit manifolds scattered around the property that may extend for hundreds, it not several hundred, feet in length. Rather than incurring that cost and the unreliability of such a watering and timer wiring system, each building may have its own sprinkler timer box which controls the sprinklers in that particular localized area. These sprinkler timer boxes are typically formed of some sort of plastic, typically polypropylene and/or polyethylene, which has some resilient characteristics and is somewhat pliable so as to withstand impacts from something as simple as a child throwing a baseball or snowball without shattering the box and exposing the timers, electrical circuits and wiring that are contained within the box.

Simple keyed cam locks are provided to secure the boxes. The typical manufacturing standard is that all boxes of a certain model that are produced by the same particular manufacture are keyed using the same key code so as to reduce the number of keys that a landscaper has to carry around when checking the timers on the circuits in the multiple boxes. The initial settings for the irrigation system when installed by the landscaper are carefully selected to provide a sufficient, but never excessive, amount of irrigation water to each irrigation circuit in the system. For example, there may be a circuit which is comprised of shrub bubblers located within a hedge row or some ornamental shrub feature of landscape, and another circuit for grassy or expansive areas that are open and yet a third for some other application such as that in a confined space where the sprinklers might, for example, be located on a small grassy area adjacent to a vehicle parking area and may require specialized sprinklers throwing rectangular or oblong patterns of water.

Sprinkler control circuits also have to be adjusted during changing seasons, for example if the spring is rainy, wet, and cool, less irrigation water will be required and the operating times for each sprinkler and perhaps the frequency of operation can be reduced, and during the heat of hot summer dry days can be increased to compensate for the increased evaporative conditions and the resulted amount of water required for irrigation.

The problem is that tenants often pry open the boxes and readjust the sprinkler timers either up or down to suit that particular tenant's needs or his perceived need for irrigation. For example, a tenant can pry the box open and turn off a sprinkler circuit where overspray on a windy day will soak down his vehicle with irrigation water and leaves dried residue on the vehicle paint as it evaporates. In other cases, it can be just the opposite where a tenant perceives a need to increase the irrigation watering cycle thinking that landscaping shrubbery and grass may need more water than is actually being provided.

The landscapers do not necessarily always check the boxes each and every time they perform maintenance on the lawn and landscaping. It may be two or three weeks before a landscaper checks the circuits and by then it may be too late in that the landscaping is fully stressed by a lack of water, or at the opposite end, the landscaper may not pick up on the increase in the watering cycles or duration of watering until the real estate owners receive an unpleasantly and unexpectedly high water bill from the municipal water system.

Referring to prior art FIG. 1, a typical prior art sprinkler timer box is disclosed. For simplicity sake, the internal timer and electrical components are not shown in the drawings. As can be seen, there is a base portion of the box which is mounted using either screws or bolts to a mounting surface, typically the side of an apartment house or commercial building. The cover is typically hinged either on the side or the bottom and is shown in the prior art drawing FIG. 1, the hinge is on the bottom and it interconnects the base portion of the box and its cover. At some appropriate location adjacent to the open end of the cover a cam lock assembly is installed which is keyed to be locked in place. This is a simple locking mechanism which simply rotates a locking cam to a position where it engages the locking tab molded integral with the box base. The problem with this type of a locking mechanism is that it can be easily defeated by a screwdriver wielding tenant intent on readjusting the irrigation control system. A tenant would simply insert the screwdriver tip between the lip of the cover, as shown in prior art FIG. 2, and then using the lip of the cover as a fulcrum, pry out, and temporarily deform the base sidewall until the locking tab disengages from the locking cam at which point the cover will simply pop open. There is enough pliability and elasticity in the resilient material that the box is formed of to enable a tenant to do this quickly and easily. Once the box is open, a tenant then readjusts the sprinkler timers however the tenant sees fit. And it may be weeks before the landscapers discover that the tenant has done this. This appears to be a common problem experienced by most landscaping maintenance companies.

Accordingly, what is needed is a way to secure these pre-existing irrigation timer boxes so as to prohibit tenants from intentionally breaking into them and readjusting the sprinkler system.

SUMMARY OF THE INVENTION

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. This Summary is neither intended to define the inventive concept of the application, which is measured by the claims, nor is it intended to be limiting as to the scope of the inventive concept in any way.

In one embodiment of the invention, a retrofitable locking bracket assembly includes a vertical extension bracket and a lower mounting bracket plate. Mounting holes provided in the lower mounting bracket allow for attachment by locking fasteners of the lower mounting bracket to an outer surface of an irrigation sprinkler timer box with hinged cover, which is generally rectangular in form. The vertical extension bracket portion is configured as having an upper length and a lower length that are separated by a bend that causes an acute angle between the upper length and the lower length. The acute angle roughly conforms to the arcuate travel experienced by the hinged cover as it is swung open about its hinges. A locking slot or locking surface is sized and located in a position on the vertical extension bracket where it will engage a locking cam of a cam locking assembly installed on the hinged cover, inside the timer box when the hinged cover is closed. A padeye hole may be also provided at the upper end of the vertical extension bracket portion as an additional security measure in situations where a box is more frequently being pried open so a padlock can be installed to simply prevent the hinged cover from being opened past a point where it is disengaged with the lock.

The locking bracket assembly is attached, in a preferred embodiment, to an outside surface of the base of the timer box. Mounting screws such as locking fasteners are passed through the mounting holes of the lower mounting bracket and preformed mounting holes in the timer box base and may be screwed into the mounting surface to which the timer box is attached. The vertical extension bracket passes between the lower mounting bracket and the side of the timer box, and into the interior of the timer box, and then out through a slot cut, or to be cut, in the hinged cover of the timer box. When the cover is closed, the operator can insert a key into the keyed cam lock assembly and rotate the cam plate until it engages the locking slot or locking surface in the vertical extension bracket to achieve its normally closed and locked position. In the locked position, an unauthorized person will experience great difficulty attempting to pry open the box by bowing out the side of the timer box to move the locking tab out of engagement with cam plate. The cover will not easily pop open because the locking cam is still engaged within the locking slot of the vertical extension bracket. Even if a person were to manage to position a second pry bar behind the vertical extension bracket, in an attempt to pry the locking bracket out from engagement with the locking cam, the attempt will fail, because the upper length of the vertical extension bracket will remain engaged within the slot in the hinged cover, thus preventing the necessary deflection of the vertical extension bracket from the locking cam plate.

In another embodiment, a locking bracket assembly according to the present invention prevents unauthorized opening of an irrigation timer box of the type having a cam lock mounted to a hinged cover. The locking bracket assembly includes a lower mounting bracket, locking hardware for attaching the lower mounting bracket to an outer surface of the timer box, and a vertical extension bracket for vertically adjustable attachment to the lower mounting bracket. An upper length of the vertical extension bracket extends at an acute angle from a lower length that is configured for parallel alignment with both the lower mounting bracket and a sidewall of the timer box. When the cover of the timer box is closed, the acute angle allows the upper length of the vertical extension bracket to pass into the timer box and emerge through a slot cut in the cover, and the cam lock can then be rotated to engage a slot formed in part of the upper length of the vertical extension bracket that remains within the timer box. An arresting tab and guide slot prevent misalignment of the brackets and allow height adjustment of the assembly to accommodate various timer box sizes.

In another embodiment, a locking bracket assembly is disclosed for use with an irrigation sprinkler timer box having a base for attachment to a fixed mounting surface, a plurality of side walls extending out from said base, a hinged cover rotatably attached to one side of the timer box, and a cam lock assembly having a rotatable cam plate mounted to the hinged cover in a position for engagement with a locking surface adjacent to a sidewall of said timer box located opposite to the side to which the hinged cover is attached, when the hinged cover is closed and the cam lock assembly is in the locked position. The locking bracket assembly includes a lower mounting bracket configured for attachment to an outer surface of the timer box, means such as locking fasteners for attaching the lower mounting bracket to the timer box base, and a vertical extension bracket configured for attachment to the lower mounting bracket. The vertical extension bracket is characterized as having an upper length and a lower length, the upper length extending from the lower length at an acute angle, and the lower length configured for parallel alignment with part of the lower mounting bracket and for parallel alignment with the timer box sidewall adjacent to the locking surface when the lower mounting bracket is attached to the outer surface of the timer box. The acute angle allows the upper length of the vertical extension bracket to pass through a slot cut in the hinged cover of the timer box when the hinged cover is closed.

Various additional features may be included in more elaborate embodiments. For example, the vertical extension bracket may provide the locking surface for engaging the rotatable cam plate. Or, the locking surface may be formed as a slot in the upper length of the vertical extension bracket, for engagement with the rotatable cam plate within the timer box when the hinged cover is closed. In other embodiments of the locking bracket assembly, the vertical extension bracket may be configured for attachment to the timer box sidewall adjacent to the locking surface, or the lower length of the vertical extension bracket may be configured for attachment between part of the lower mounting bracket and the timer box sidewall adjacent to the locking surface.

In another embodiment of the invention, the locking bracket assembly includes features that allow for vertical adjustment of the overall height of the assembly, for compatibility with different sizes of timer boxes. For example, the locking bracket assembly may be configured to provide a vertical extension bracket with a plurality of spaced apart mounting holes that allow for attachment to the lower mounting bracket. In another embodiment, a locking bracket assembly includes a guide slot defined along an interior longitudinal center of the lower mounting bracket, and an arresting tab formed on the vertical extension bracket and configured to protrude through the guide slot when the vertical extension bracket is attached to the lower mounting bracket. The combination of locking fasteners and engagement of the arresting tab within the guide slot prevent an intruder from defeating the cam lock by detaching the locking brackets and from the timer box.

The locking bracket assembly is primarily intended for a retrofit application in an existing timer box, but it can be included and indeed even incorporated as an original manufactured feature of each timer box.

Still other features and advantages of the presently disclosed and claimed inventive concept will become readily apparent to those skilled in this art from the following detailed description describing preferred embodiments of the inventive concept, simply by way of illustration of the best mode contemplated by carrying out the inventive concept. As will be realized, the inventive concept is capable of modification in various obvious respects all without departing from the inventive concept. Accordingly, the drawings and description of the preferred embodiments are to be regarded as illustrative in nature, and not as restrictive in nature.

DETAILED DESCRIPTION

Figure 1:
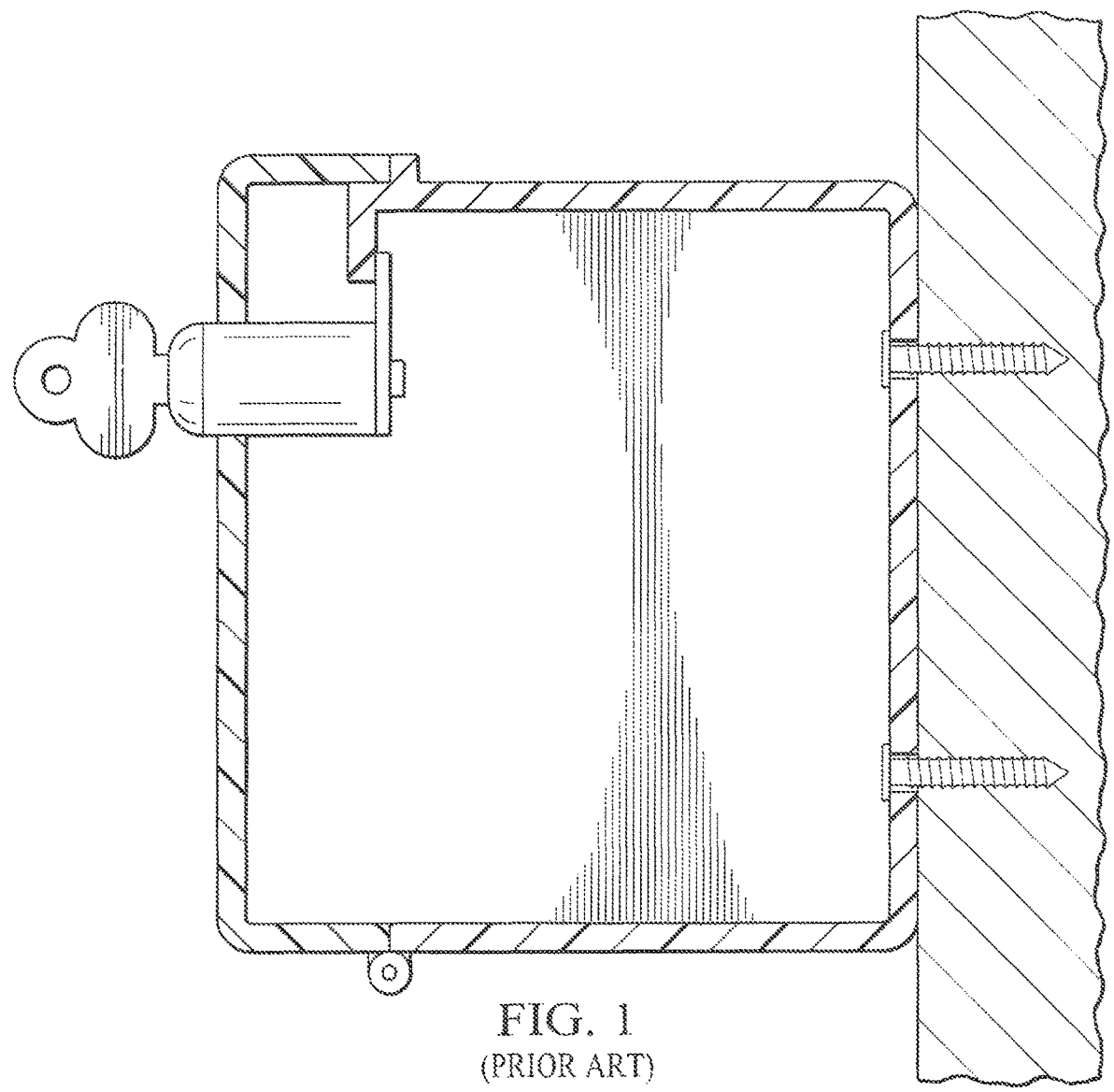
FIG. 1 is prior art drawing of a typical prior art irrigation control box.

While the presently disclosed inventive concept is susceptible of various modifications and alternative constructions, certain illustrated embodiments thereof have been shown in the drawings and will be described below in detail. It should be understood, however, that there is no intention to limit the inventive concept to the specific form disclosed, but, on the contrary, the presently disclosed and claimed inventive concept is to cover all modifications, alternative constructions, and equivalents falling within the spirit and scope of the inventive concept as defined in the claims.

Figure 3:
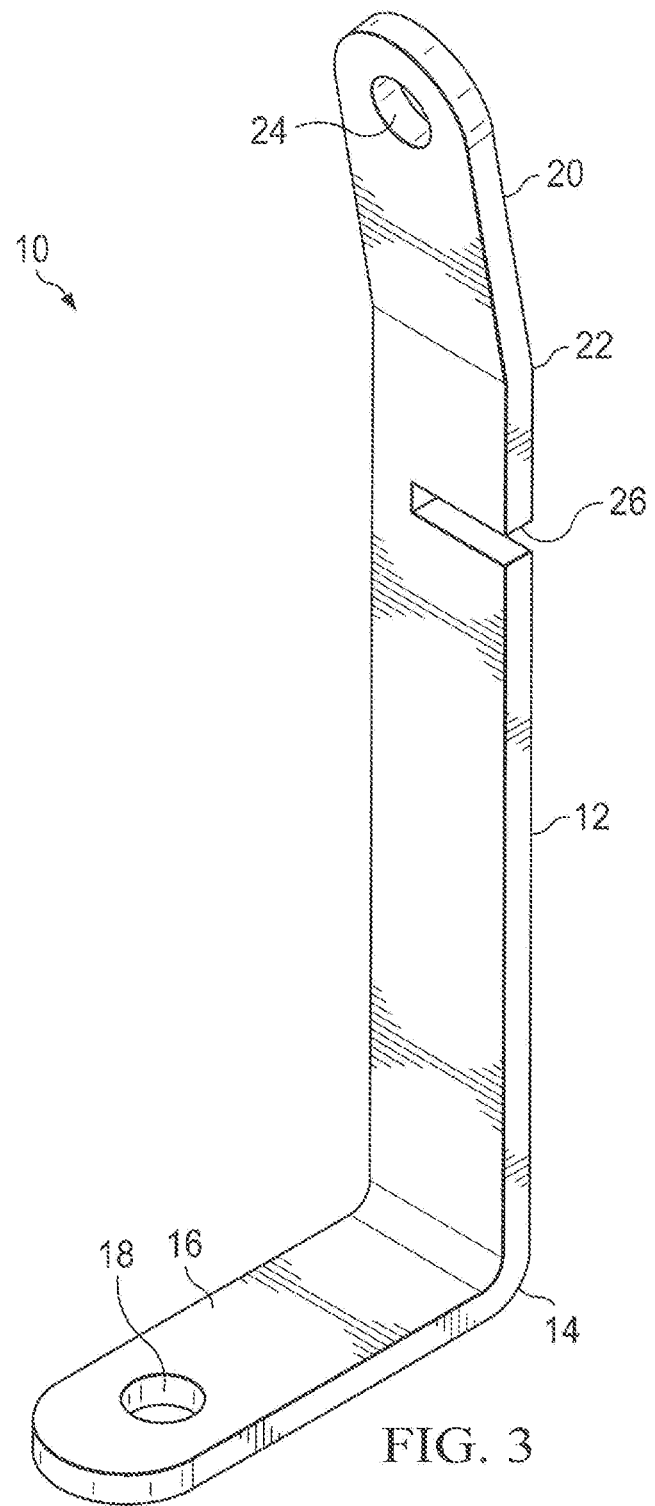
FIG. 3 is perspective representational view of the new locking bracket.
Figure 4:
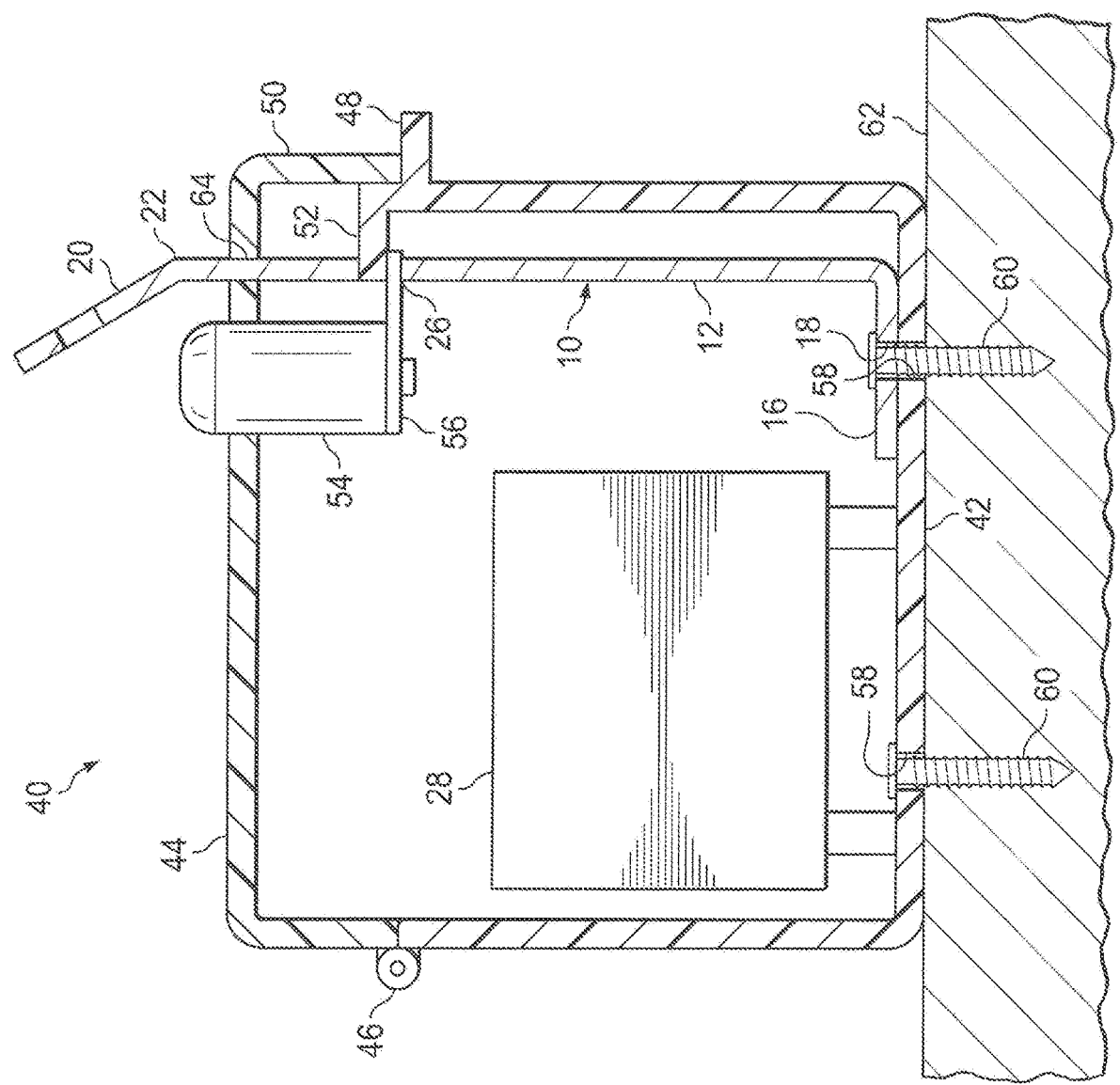
FIG. 4 is a side view of the typical installation of the locking bracket as shown in FIG. 3.

FIG. 3 is a perspective representation of the first embodiment of the retrofitable locking bracket 10, which is formed of vertical extension bracket 12 and a base plate 16 interconnected at a 90 degree bend 14. There is at least one mounting hole 18 provided in base plate 16 to attach the locking bracket to a mounting bolt or screw which mounts to the base 42 of the timer box 40 to a mounting surface. In upper extension bracket portion 20 is also provided and configured, at bend 22, to an angle which roughly conforms to the arcuate travel experienced by the hinged cover 44 as it is swung open about its hinges. A locking slot 26, shown in FIG. 3, is sized and located in a position where it will engage a rotatable locking cam 56 as shown in FIG. 4. Padeye hole 24 is also provided so that as additional security in situations where a box is more frequently being pried open so that a padlock can be installed to simply prevent the hinged cover 44 from being opened past a point where it is disengaged with the cam locking plate engaged within locking slot 26 in locking bracket 10.

Figure 2:
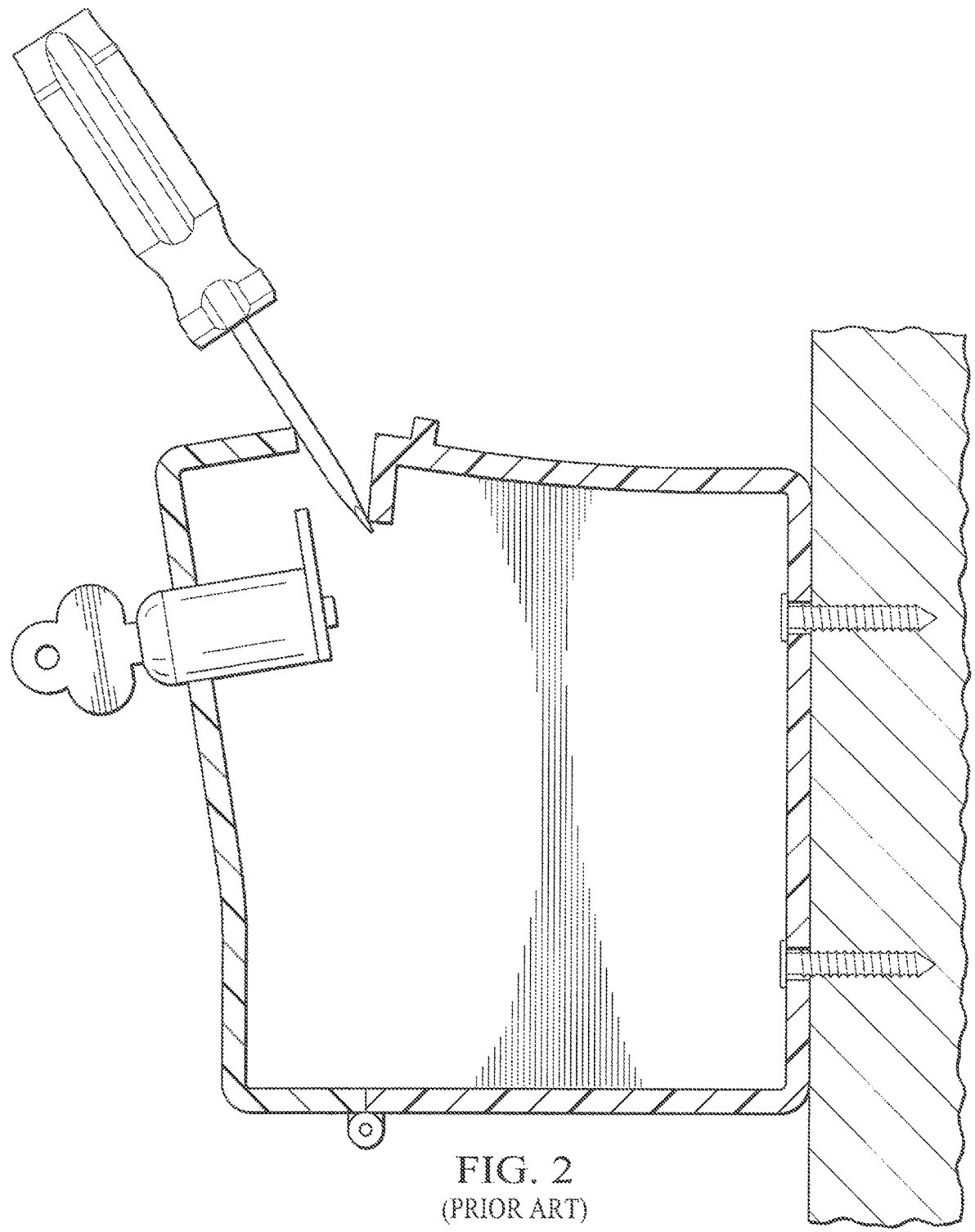
FIG. 2 is a prior art drawing of screwdriver, used as a lever, being used to deform the typical prior art irrigation control box base to disengage with a locking pawl.

As shown in FIG. 4, locking bracket 10 is attached, in the preferred embodiment, to the inside surface of base 42 of timer box 40. Mounting screws 60 pass through the mounting holes 18 in locking bracket base 16 and the preformed mounting holes at 58 in base 42 of timer box 40, as shown in this example, are screwed into mounting surface 62. Vertical extension bracket 12 passes up and between locking tab 52 and cam lock assembly 54 and extends out through a slot 64 to be cut in hinged cover 44. Vertical extension bracket 12 is not attached to any of the side walls of circuit box 40, and therefore will not deflect with any sidewall of timer box 40 if the same is being pried open to disengage its locking tab 52 from locking cam plate 56 as shown in prior art FIG. 2. As can be seen in the upper extension bracket portion 20 is bent to an angle that roughly conforms to the arcuate line of travel of slot 64 to enable the easy opening and closure of hinged cover 44 as it is rotated about hinges 46. The operator then can insert a key, not shown, into the key lock assembly and rotate the cam locking plate 56 until it engages through locking bracket slot 26 to its normally closed and locked position where it will also engage locking tab 52. Now, if an unauthorized person attempts to pry open the box by bowing out the side of the base to move the locking tab 52 out of engagement with cam plate 56, the hinged cover will still not pop open since locking cam plate 56 is still engaged within slot 26 of mounting locking bracket 10. And since locking bracket 10 is not firmly attached to the sidewall of timer box 40, it does not move even when side wall 42 is bent outwards to disengage locking tab 52 from cam lock 56. Even if a person were to manage to position a second pry bar behind vertical extension bracket 12 in an attempt to pry locking bracket 10 out from engagement with locking cam plate 56, the attempt will fail, as upper vertical extension bracket portion 20 will remain engaged within slot 64 in hinged cover 44 thus preventing the necessary deflection of locking bracket 10 from locking cam plate 56.

Irrigation electronic control timer module 28 is shown representationally mounted to base 42 of timer box 40 in FIG. 4. In the typical configuration for these control modules 28 and how they are interconnected to the lockable timer box 40 which include permanently installed electrical buses either with bayonet connections or screwed connections to receive, hold, and interconnect the timer mechanism control module 28 to its power supply and also to the control wiring for the solenoids of the various irrigation circuits located throughout the landscaped area, usually near a central manifold location for each particular set of irrigation circuits. In such cases, it is a simple matter to turn off the power source to the control box, temporarily remove the control module 28, install the locking bracket 10 in its proper position, cut the slot 64 in the hinged cover 44 at its proper location, and then reinstall the control module 28 and lock the box.

In this matter, the locking bracket 10 is affixed to the back of time box 40 within the lockable timer box where it is not accessible to an intruder who is attempting to open the timer box.

In some cases, it may not be feasible to remove the electronic timer modules. In these cases, the lockable bracket can be configured to pass through the bottom base 42 of the box and be mounted directly to the mounting surface between the base 42 of timer box 40 and the mounting surface where it is equally as inaccessible to the intruder as if it were installed inside the box.

While the locking bracket is primarily intended for a retrofit application, it can be included and indeed even incorporated as an original manufactured feature of each box.

Figure 5:
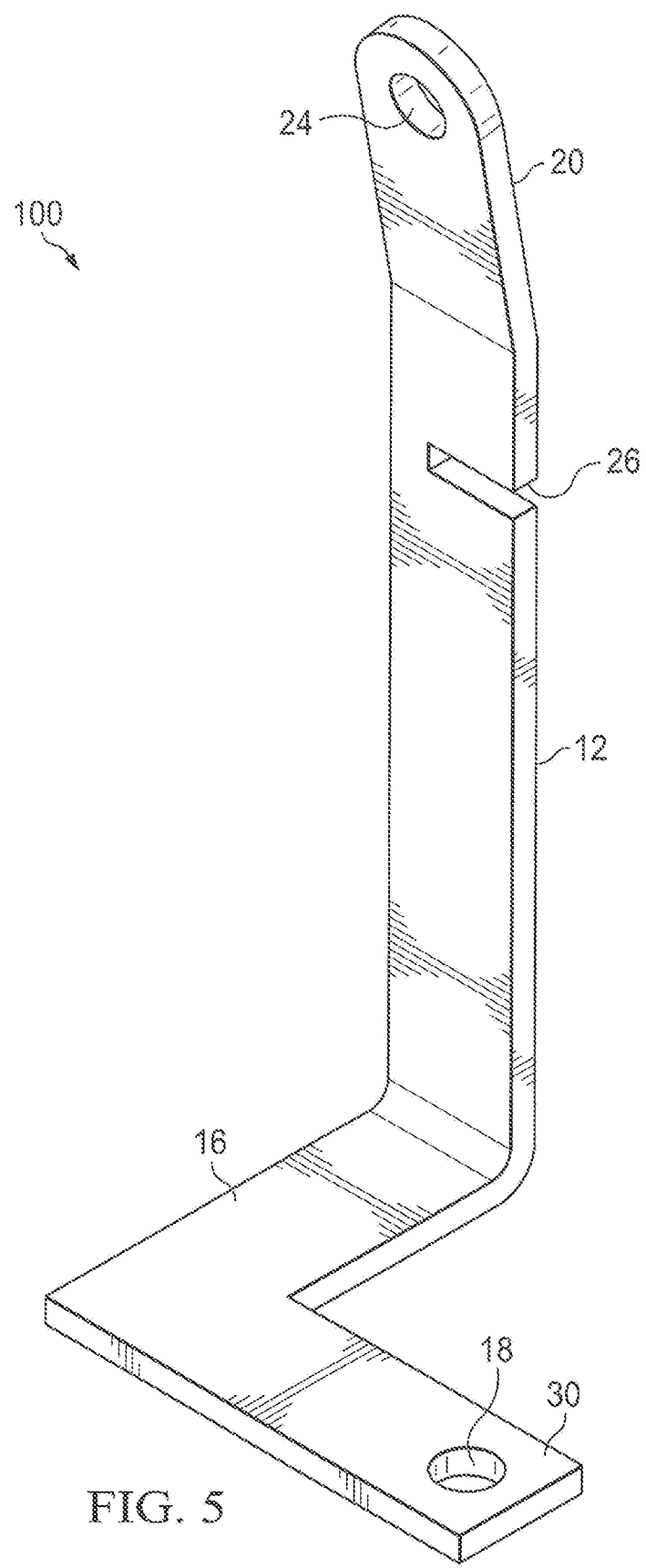
FIG. 5 is a representational side view of a second design for a locking bracket of a different configuration than having an offset base leg for aligning the mounting hole of the locking bracket to the mounting hole in the timer box.

In most cases, for the most common irrigation boxes, the mounting holes 58 typically line up with a cam lock. In those cases where they do not for any particular make and model of the irrigation control box where the mounting holes 58 do not line up with the cam lock the base portion 16 can be reconfigured to provide for such an alignment as shown in FIG. 5. As shown in FIG. 5, first variant locking bracket 100 is provided with offset base portion leg 30 and relocated mounting hole 18. Offset leg portion 30 can be configured in a variety of different lengths, and offset to the left or right, or even at an angle, in order to site relocated mounting hole 18 to coincide with the location of the mounting holes 58 in timer box 40.

Figure 6:
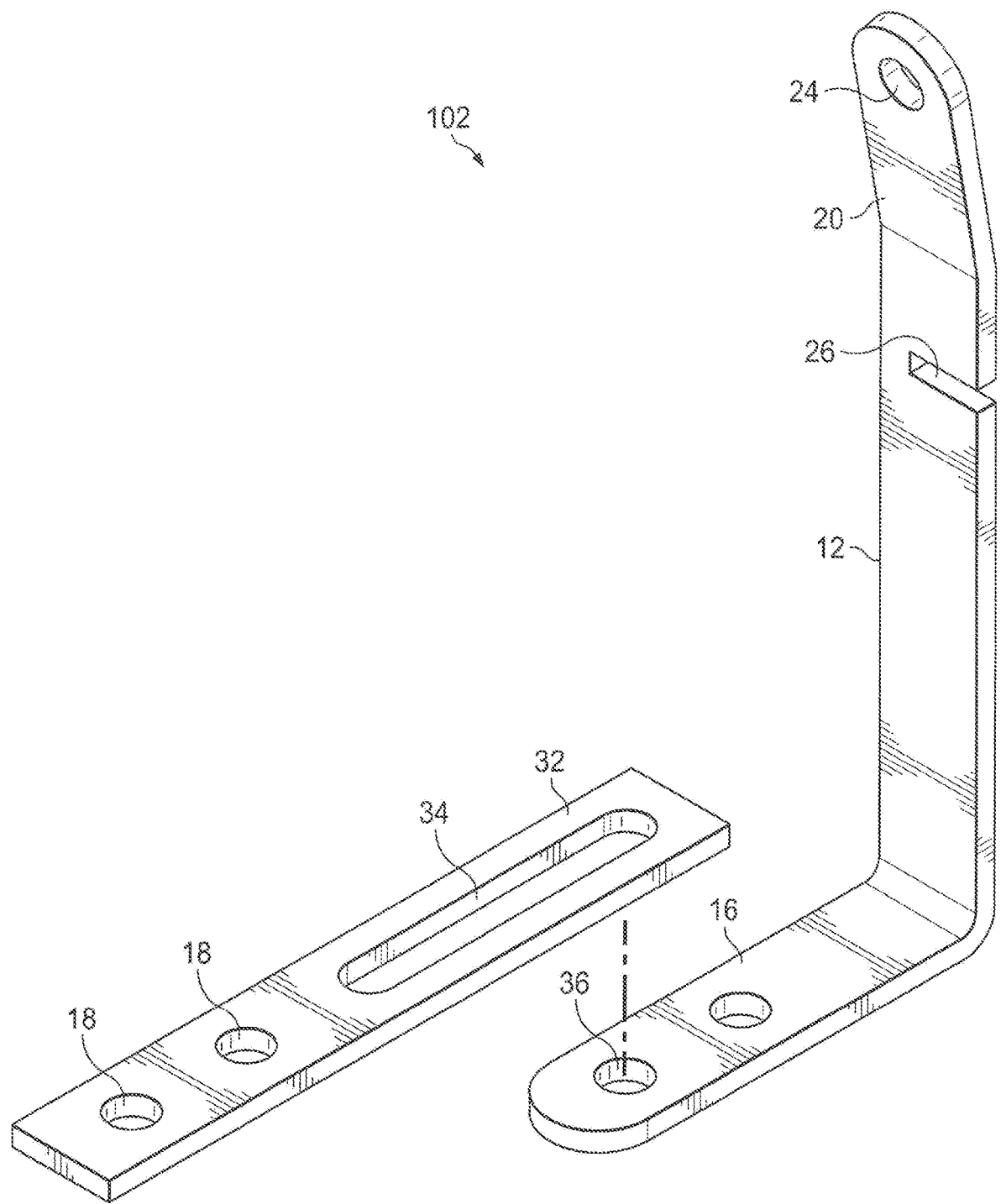
FIG. 6 is a third embodiment of the locking bracket showing an adjustable attachment configuration for a third design of the locking bracket.

In high risk areas and neighborhoods it may be advantageous to mount the locking bracket 10 to attach it at least two mounting bolts or screws inside or at the back of the box 40. This can be accomplished by extending the base portion 16 by incorporation of adjustable base portion 32, to a greater length so that it engages with two mounting holes as shown in FIG. 6. As shown in FIG. 6, adjustable base portion 32 is provided with an adjustment slot 34 which can be connected through use of flat head screws (not shown) to adjustable base portion mounting hole 36 formed in base portion 16 of adjustable locking bracket 102. It can also be done by using some sort of an interconnected adjustable base portion that can telescope in or out as needed to fit the bolt mounting holes for any particular box as shown in FIG. 6. Adjustable base portion 32 can be mounted either underneath or on top of base portion 16 of adjustable locking bracket 102, as in either case, once attached using timer box 40 mounting holes 58 using mounting screws 30 it will be clamped firmly in place.

Figure 7:
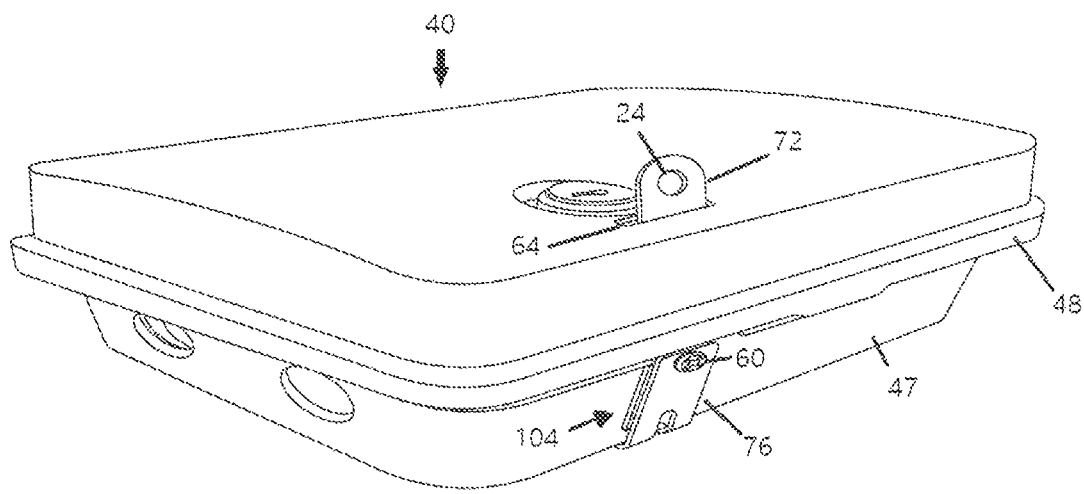
FIG. 7 is a perspective view of a typical installation into a lockable timer box of a fourth embodiment of a locking bracket according to the invention.

FIG. 7 shows a perspective view of a typical installation 70 of a fourth embodiment of a locking bracket of the present invention, as installed into a lockable timer box 40. The lockable timer box 40 has characteristics as described above in the context of prior embodiments. The fourth embodiment of the locking bracket may be characterized as comprising a locking bracket assembly 104 of multiple brackets, of which at least one bracket attaches to the side wall 47 of timer box 40. In this example, locking bracket assembly 104 includes a vertical extension bracket 72 and a lower mounting bracket 76. As shown in FIG. 7, at least a portion of each bracket 72 and 76 is configured for attachment to side wall 47 on the outside of timer box 40, for example, by means of a fastener 60.

Figure 8:
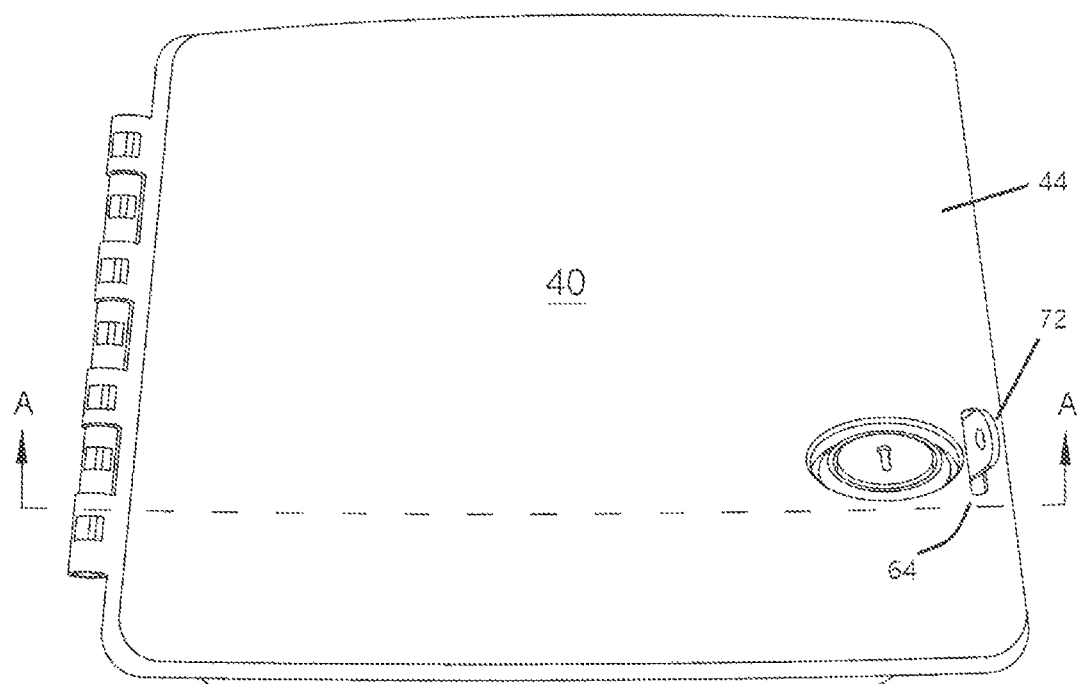
FIG. 8 is a top view of the typical installation of FIG. 7, showing Section line A-A.

FIGS. 8 to 12 illustrate various additional views of the typical installation 70 of the locking bracket assembly 104 into a lockable timer box 40. FIG. 8 shows a typical location for slot 64, which is sized and located to allow the vertical extension bracket 72 to protrude through the hinged cover 44 and place the padeye hole 24 at a position above the hinged cover 44 to allow for attachment of a padlock shank through the padeye hole. The slot 64 may be formed as part of a retrofit modification to a timer box 40 sold by the manufacturer without a pre-installed locking bracket or locking bracket assembly according to the invention.

Figure 9:
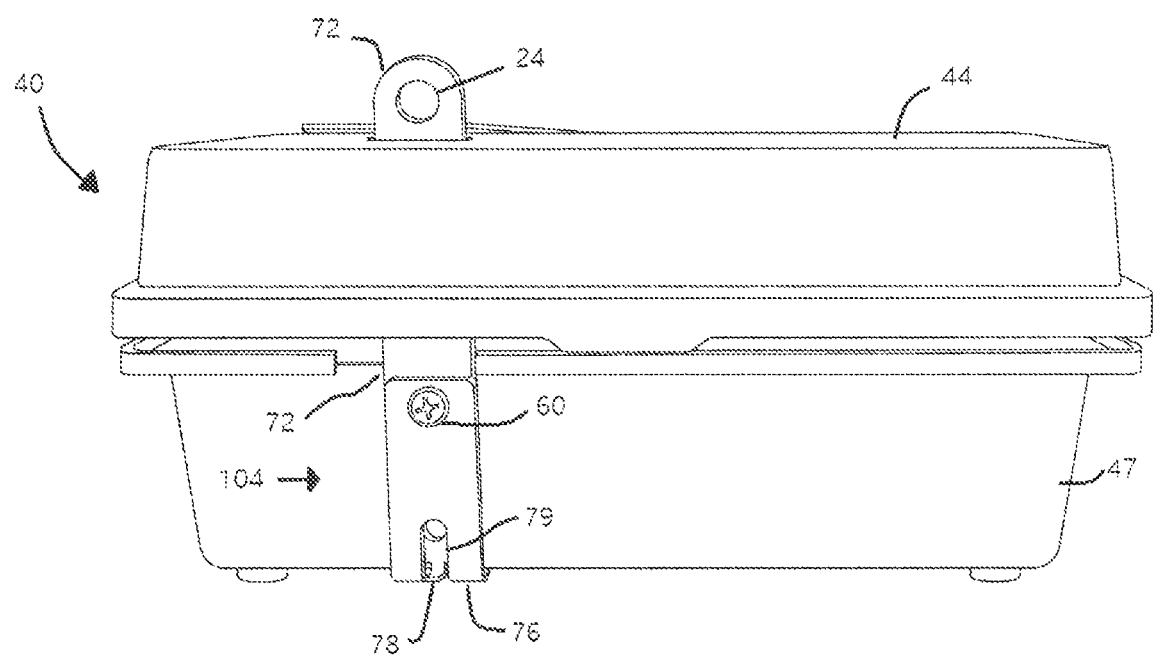
FIG. 9 is a right side view of the typical installation of FIG. 7.

FIG. 9 shows a right side view of the installation 70. In this view, the hinged cover 44 is slightly ajar to better illustrate the configuration of the locking bracket assembly 104. In this embodiment, the vertical extension bracket 72 is placed between side wall 47 and the lower mounting bracket 76. The vertical extension bracket 72 is aligned with the lower mounting bracket 76 so that one or more fasteners 60 may pass through mounting holes defined in both brackets to secure the assembly 104 to the timer box 40. Preferably, the fastener 60 is a locking-type or self-locking fastener that will now allow removal thereof by manipulation only from outside the timer box 40. Alignment of the two brackets also allows an arresting tab 78 to protrude through a guide slot 79, as shown. The arresting tab 78 may be formed at or near the lower end of the vertical extension bracket 72, and may be formed as an integral part of the vertical extension bracket, e.g. by machining and bending the bracket 72 from metal stock. Arresting tab 78 helps to maintain alignment of brackets 72 and 76 during installation while tightening fastener 60. Arresting tab 78 also prevents displacement or misalignment of vertical extension bracket 72 as a result of tampering in an unauthorized attempt access to the controls within timer box 40.

Figure 10:
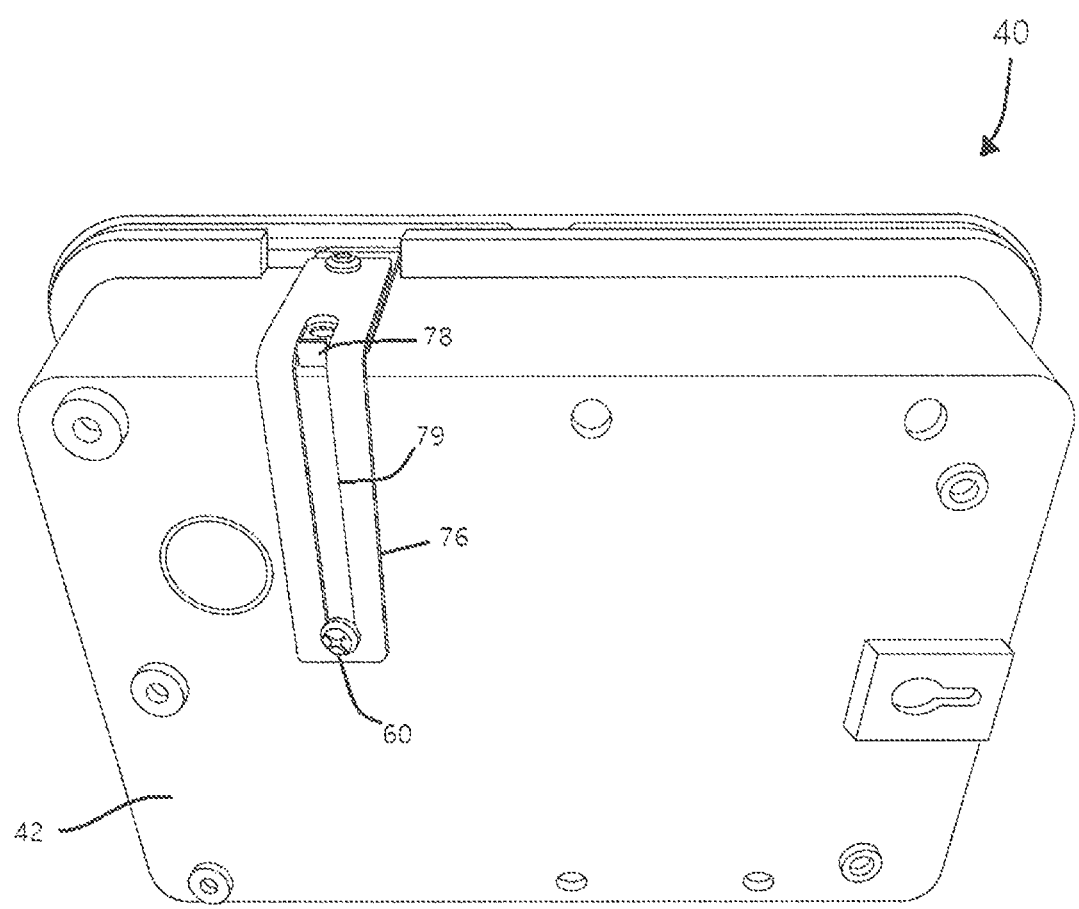
FIG. 10 is a lower perspective view of the typical installation of FIG. 7.

FIG. 10 shows a lower perspective view of the installation 70. The lower mounting bracket 76 is shown attached to the base 42 of the timer box 40 by another fastener 60. Lower mounting bracket 76 may be angled to allow a first portion of bracket 76 to abut side wall 47 while a second portion of bracket 76 extends from the first portion at an angle that allows the second portion to abut the surface of base 42. For example, where the surface of side wall 47 forms a 90-degree angle with the surface of base 42, the first portion of bracket 76 may form a 90-degree angle, or near 90-degree angle, with respect to the second portion of bracket 76. In this embodiment, guide slot 79 is defined along the interior longitudinal center of the second portion of the lower mounting bracket 76, to allow the fastener 60 to engage a mounting hole formed in base 42 at any of various locations that align with the longitudinal center. In other embodiments, the guide slot 79 may be replaced by one or more guide slots of a different length than what is shown, or with one or more through-holes.

Figure 11:
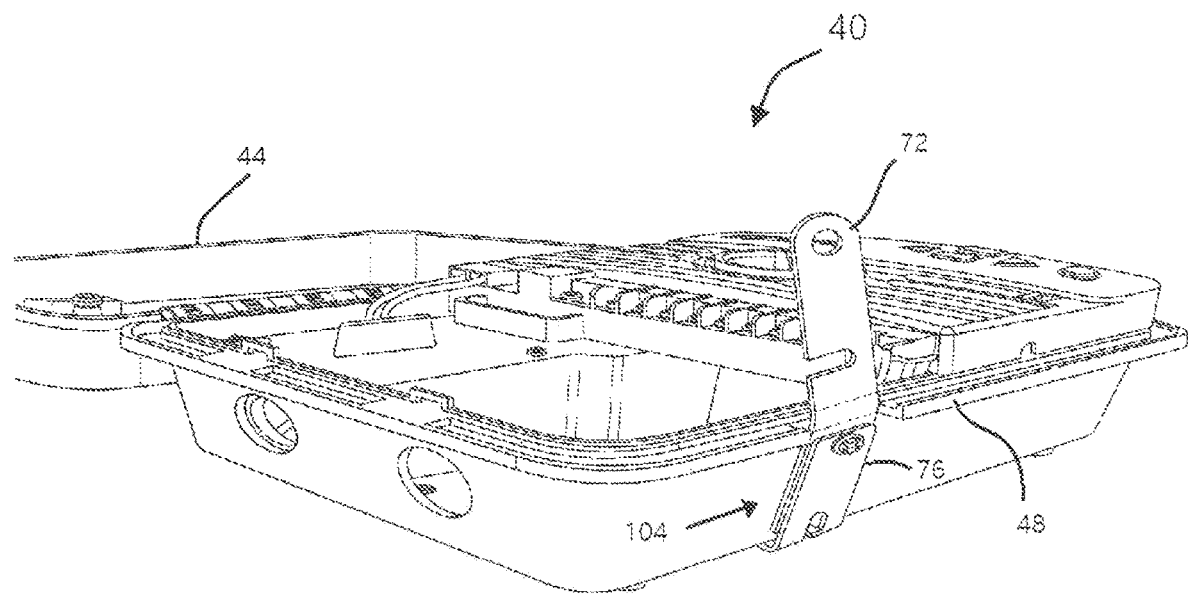
FIG. 11 is a perspective view of the typical installation of FIG. 7, shown with the lid open on the lockable timer box.

FIG. 11 provides a perspective view of the installation 70, with the hinged cover 44 of timer box 40 shown in an open position. Similar to prior embodiments, the vertical extension bracket 72 is formed with a bend 22 at an intermediate position along its length. When installed onto the timer box 40, the bend 22 aligns horizontally and approximately with a rim 48. The rim 48 provides an abutment surface for engaging the hinged cover 44 when the hinged cover 44 is in a closed position, as shown in FIG. 7. The angle of bend 22 roughly conforms to the arcuate travel of the hinged cover 44 as it rotates about it hinge between open and closed positions. Accordingly, with locking bracket assembly 104 properly installed on the timer box 40, closure of the hinged cover 44 causes the vertical extension bracket 72 to pass through slot 64 with little or no interference.

Figure 12:
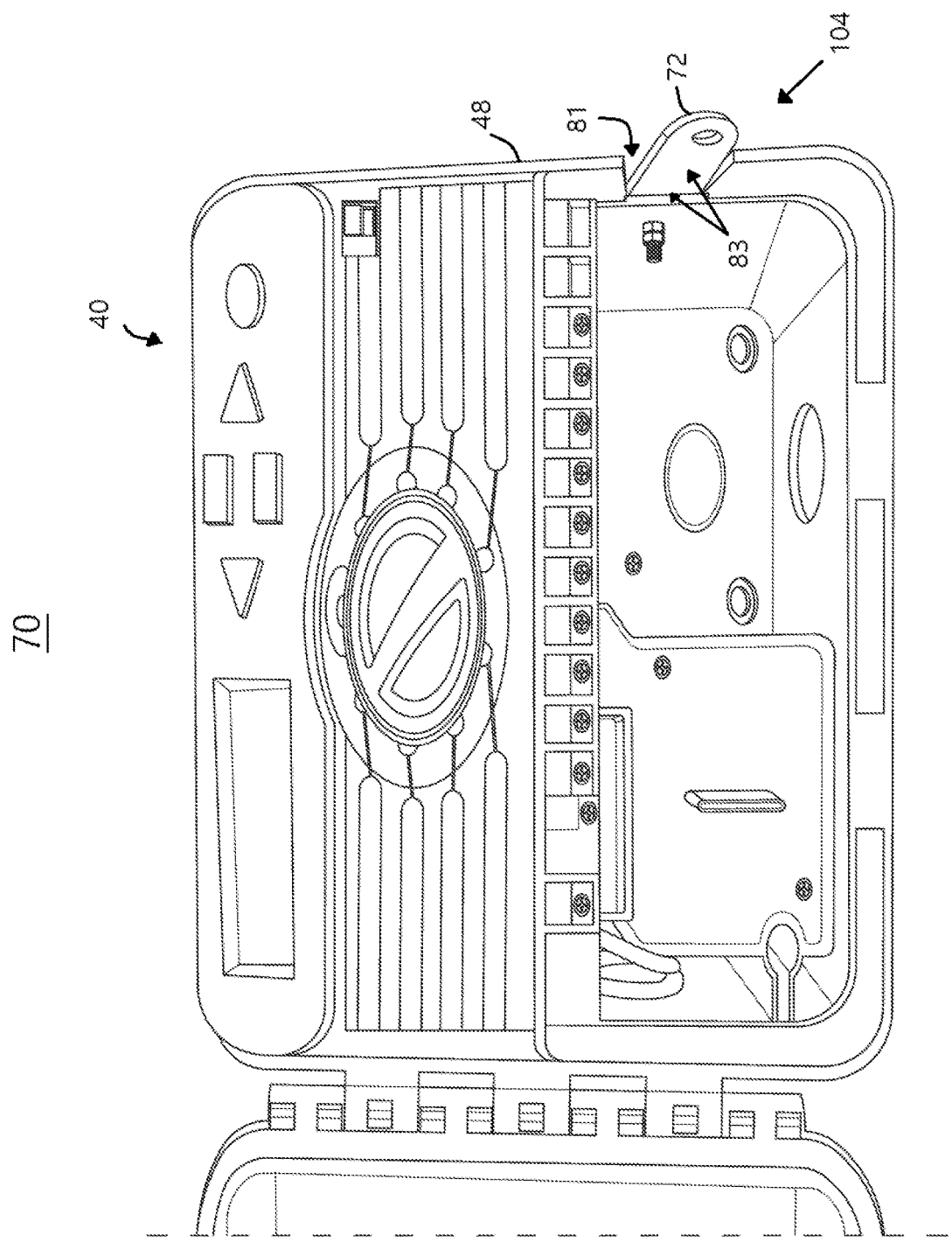
FIG. 12 is a partial top view of the typical installation of FIG. 11.

FIG. 12 shows a partial top view of the installation 70. This view shows two locations—recessed area 81 and locking space 83—which are cleared of any obstructions to allow installation of a locking bracket assembly 104 according to various embodiments of the invention. Recessed area 81 indicates, generally, a gap in the rim 48 that allows the vertical extension bracket 72 to abut the side wall 47 and pass through the recessed area 81 so that an upper portion of the vertical extension bracket 72 may be contained within the timer box 40 when the hinged lid 44 is closed. In one embodiment, the timer box 40 is manufactured with a recessed area 81 to accommodate the locking bracket assembly. In another embodiment of the invention, the timer box 40 is modified after manufacture by removing timer box material to create the recessed area 81.

Locking space 83 defines a volume interior to the timer box 40 that is located above the height of rim 48 and beneath the upper portion of the vertical extension bracket 72 that is contained within the timer box 40 when the hinged lid 44 is closed. In one embodiment, the timer box 40 is manufactured with a locking space 83 devoid of all material so that the rotatable locking cam 56 may be freely rotated into and out of engagement with the locking slot 26. In another embodiment of the invention, the timer box 40 is modified after manufacture by removing all material and components, including OEM locking mechanism components, that would otherwise interfere with engagement of the rotatable locking cam 56 with the locking slot 26 because those materials or components lie within the locking space 83 when the hinged cover 44 is fully open.

Figure 13:
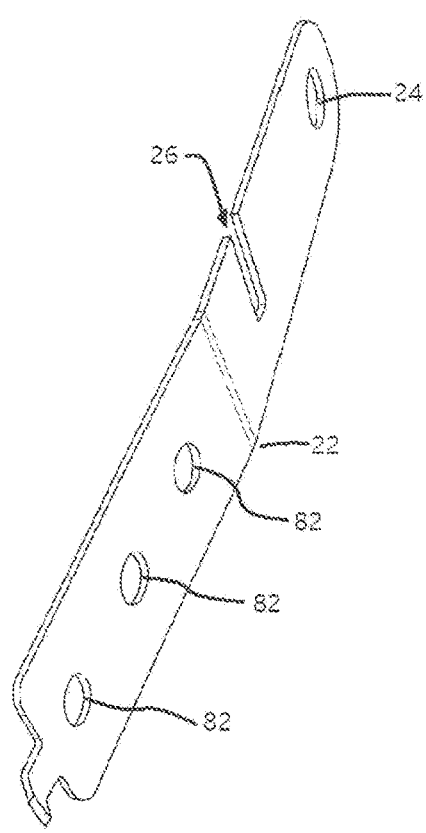
FIG. 13 is a perspective view of a vertical extension bracket according to the present invention.

FIG. 13 shows a perspective view of one implementation of a vertical extension bracket 72 according to the invention. This figure illustrates typical locations for the bend 22, padeye hole 24, locking slot 26, arresting tab 78, and one or more mounting holes 82. Mounting holes 82 provide optional locations for alignment of a fastener 60 with a corresponding mounting hole (not shown) formed through side wall 47 of the timer box 40, and with guide slot 79 of the lower mounting bracket 76. The plurality of mounting holes 84 advantageously allows proper fit of a locking bracket assembly 104 to different makes and sizes of timer boxes. While three mounting holes 82 are depicted in the figure and evenly spaced, other numbers, sizes and configurations of the mounting hole scheme are possible within the scope of the invention.

Figure 14:
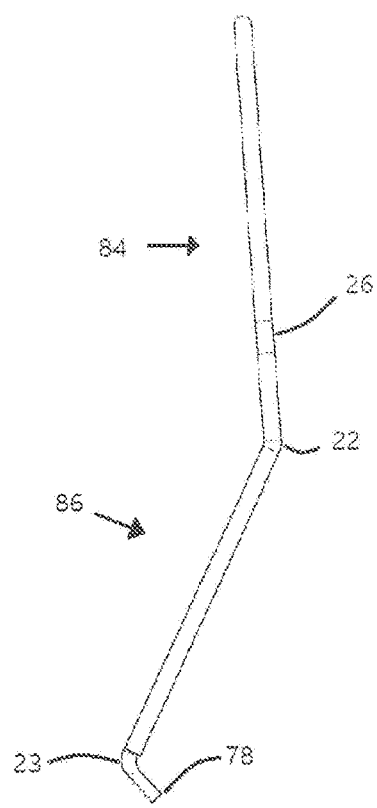
FIG. 14 is a side view of the vertical extension bracket of FIG. 13.

FIG. 14 shows a side view of the vertical extension bracket of 72. Vertical extension bracket 72 has an upper length 84 and a lower length 86 that are separated by the bend 22, as shown. The angle of each bend at 22 and 23 may vary for cooperation with other parts of the locking bracket assembly 104 and timer box 40. For example, the angle created by bend 22 may be adjusted to conform approximately to the arcuate travel of the hinged cover 44 as it rotates about it hinge between open and closed positions to allow the upper length 84 of the vertical extension bracket 72 to slide through the slot 64 without undue interference. Bend 23 may form an angle sufficient to ensure that the arresting tab 78 protrudes through the guide slot 79 to prevent misalignment, e.g. by a tampering attempt, of the vertical extension bracket 72 and the lower mounting bracket 76. In one embodiment, the angle made by bend 23 is between about 30 and 45 degrees.

Figure 15:
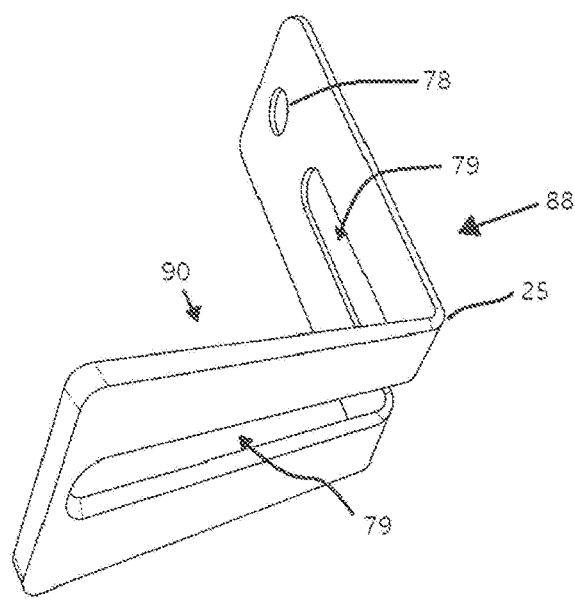
FIG. 15 is a perspective view of a lower mounting bracket according to the present invention.

FIG. 15 shows a perspective view of a lower mounting bracket 76 according to the invention. The lower mounting bracket 76 may consist of an upper length 88 and a lower length 90 that are separated by the bend 25. At least one mounting hole 78 may be provided for fastening the lower mounting bracket 76 to the vertical extension bracket 72. Guide slot 79 is shown as one continuous slot that continues along both the upper and lower lengths 88 and 90. In other embodiments, guide slot 79 may be replaced by a plurality of slots or mounting holes distributed over generally the same location as the guide slot 79. In one embodiment, the bend 25 creates an angle between the upper length 88 and the lower length 90 of about 90 degrees. That angle may vary above or below 90 degrees to allow the upper length 88 to abut the outer surface of the upper length 82 of bracket 72, and to allow the lower length 90 to abut the outer surface of the base 42 of the timer box 40.

Figure 16:
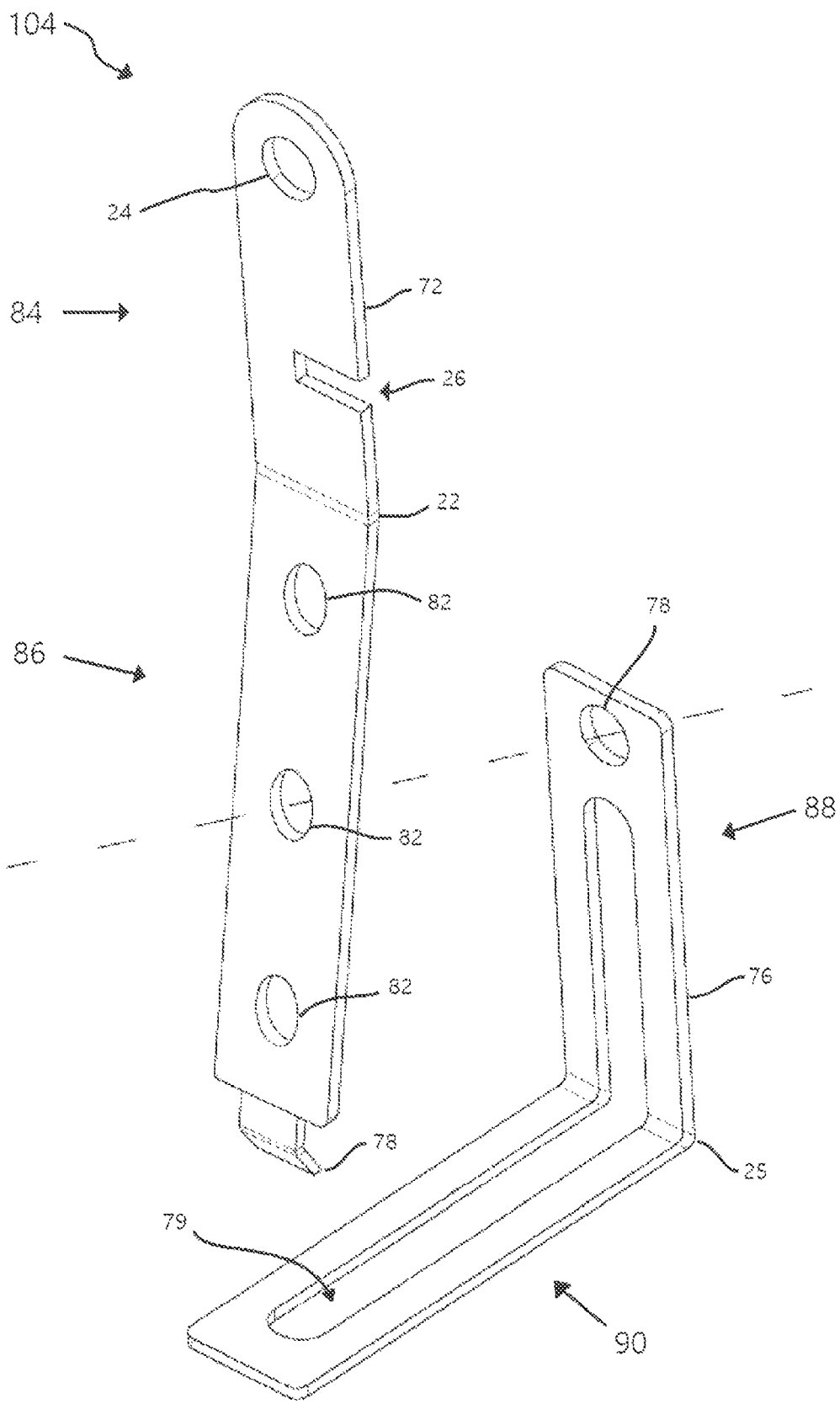
FIG. 16 is an exploded view of a locking bracket assembly according to an embodiment of the invention, illustrating adjustable assembly of the vertical extension bracket to the lower mounting bracket.

FIG. 16 is an exploded view of a locking bracket assembly 104 according to an embodiment of the invention. The locking bracket assembly 104 includes the vertical extension bracket 72 and the lower mounting bracket 76. The assembly 104 is made adjustable, for installation of timer boxes that have different heights or configurations, by allowing any of fastener holes 82 to be aligned with fastener hole 78 before fastening the brackets 72 and 76 to the side wall 47. With the outer surface of the lower length 86 aligned with the inner surface of upper length 88, the overall height of the locking bracket assembly 104 may be adjusted by sliding length 86 along length 88 to adjust the amount of overlap. During the adjustment, the arresting tab 78 passes through the elongated guide slot 79 to maintain brackets 72 and 76 in proper alignment.

Figure 17:
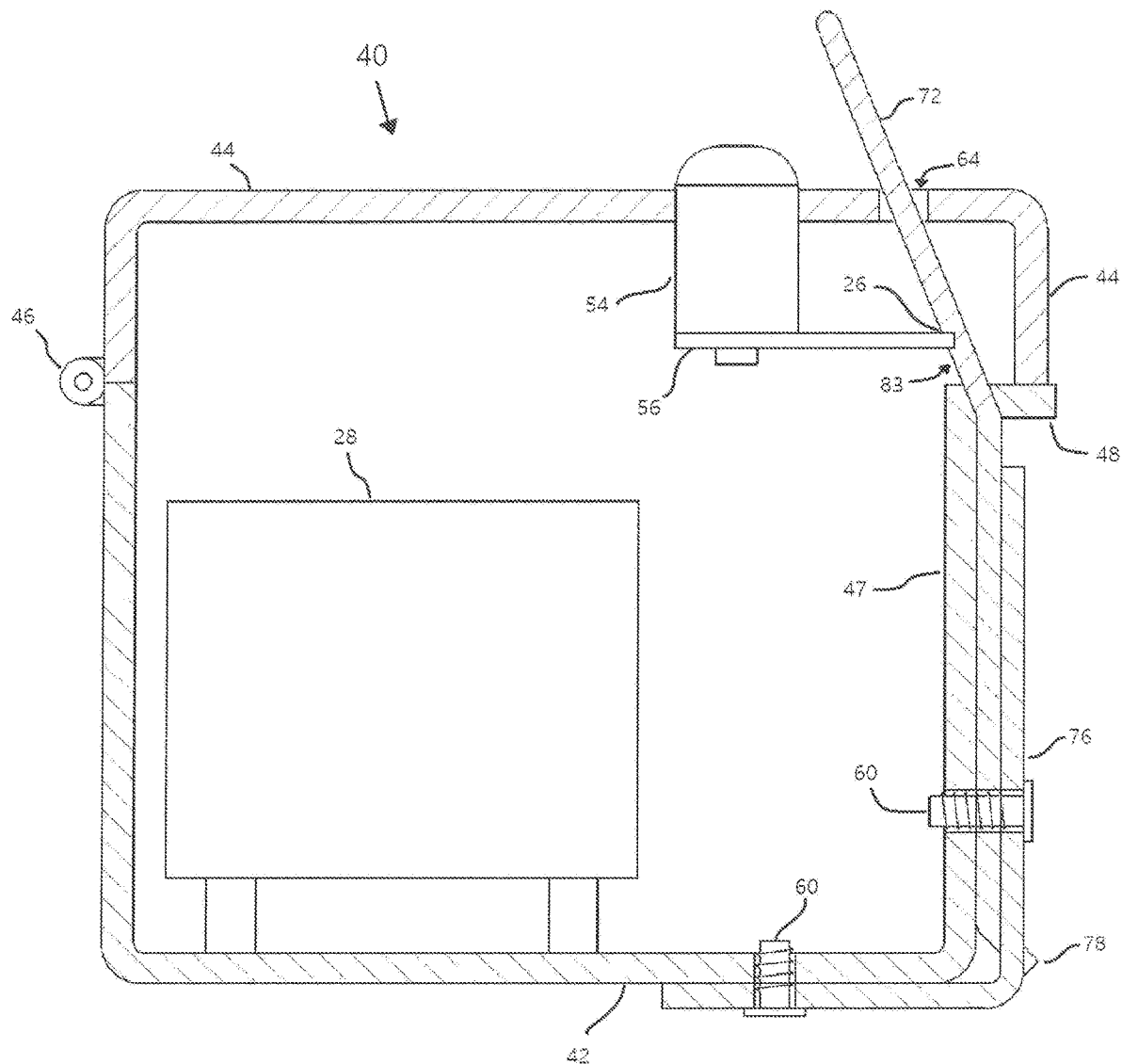
FIG. 17 is a cross sectional frontal view of the lockable timer box having the locking bracket installed as in FIG. 7, taken along section line A-A of FIG. 8.

FIG. 17 is a cross sectional frontal view of the lockable timer box having the locking bracket installed as in FIG. 7, taken along section line A-A of FIG. 8. Here, irrigation electronic control timer module 28 is shown representationally mounted to base 42 of timer box 40, in a typical manner as previously described with reference to FIG. 4. In this embodiment, however, the locking bracket assembly 104, consisting of the vertical extension bracket 72 and the lower mounting bracket 76, is affixed to the outer surface of timer box 40. These brackets strengthen the connection between the hinged lid 44 and the side 47 of the timer box 40, to prevent an intruder from tampering with the box and forcing it open by the manner depicted in FIG. 2. The locking fasteners 60 and the engagement of the arresting tab 78 within the guide slot 79 prevent an intruder from defeating the cam lock by detaching the locking brackets 72 and 76 from the timer box. While the locking bracket assembly 104 is primarily intended for a retrofit application, it can be included and indeed even incorporated as an original manufactured feature of a timer box.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A locking bracket assembly, for use with an irrigation sprinkler timer box having a base for attachment to a fixed mounting surface, a plurality of side walls extending out from said base, a hinged cover rotatably attached to one side of the timer box, and a cam lock assembly having a rotatable cam plate mounted to the hinged cover in a position for engagement with a locking surface adjacent to a sidewall of said timer box located opposite to the side to which the hinged cover is attached, when the hinged cover is closed and the cam lock assembly is in the locked position, the locking bracket assembly comprising:
   a lower mounting bracket configured for attachment to an outer surface of the timer box;
   means for attaching the lower mounting bracket to the timer box base; and
   a vertical extension bracket configured for attachment to the lower mounting bracket, the vertical extension bracket having an upper length and a lower length, the upper length extending from the lower length at an acute angle, the lower length configured for parallel alignment with at least part of the lower mounting bracket and for parallel alignment with the timer box sidewall adjacent to the locking surface when the lower mounting bracket is attached to the outer surface of the timer box;
   wherein the acute angle allows the upper length of the vertical extension bracket to pass through a slot cut in the hinged cover of the timer box when the hinged cover is closed.

2. The locking bracket assembly of claim 1, wherein said vertical extension bracket comprises the locking surface.

3. The locking bracket assembly of claim 2, wherein the locking surface comprises a slot formed in the upper length of the vertical extension bracket.

4. The locking bracket assembly of claim 3, wherein the slot is configured for engagement with the rotatable cam plate within the timer box when the hinged cover is closed.

5. The locking bracket assembly of claim 1, wherein the acute angle generally conforms to the arcuate angle at which the hinged cover travels when the hinged cover is swung open or closed.

6. The locking bracket assembly of claim 1 wherein the vertical extension bracket is configured for attachment to the timer box sidewall adjacent to the locking surface.

7. The locking bracket assembly of claim 6 wherein the lower length of the vertical extension bracket is configured for attachment between part of the lower mounting bracket and the timer box sidewall adjacent to the locking surface.

8. The locking bracket assembly of claim 1 further comprising means for attaching the lower mounting bracket to the timer box sidewall adjacent to the locking surface.

9. The locking bracket assembly of claim 1 further comprising vertically adjustable means for attaching the vertical extension bracket to the lower mounting bracket.

10. The locking bracket assembly of claim 9 wherein the vertically adjustable attaching means comprises a plurality of mounting holes defined through the vertical extension bracket.

11. The locking bracket assembly of claim 9 wherein the vertically adjustable attaching means comprises a guide slot defined along an interior longitudinal center of the lower mounting bracket.

12. The locking bracket assembly of claim 11 wherein the vertically adjustable attaching means further comprises an arresting tab formed on a lower end of the vertical extension bracket, the arresting tab configured to protrude through the guide slot.

13. The locking bracket assembly of claim 1, wherein the lower mounting bracket is configured for attachment to the base of the timer box and along the timer box sidewall adjacent to the locking surface.

14. The locking bracket assembly of claim 1 further comprising:
   means for attaching the vertical extension bracket to the lower mounting bracket;
   a guide slot defined along an interior longitudinal center of the lower mounting bracket; and
   an arresting tab formed on the vertical extension bracket and configured to protrude through the guide slot when the vertical extension bracket is attached to the lower mounting bracket.

* * * * *